US012714033B2

(12) United States Patent
Long et al.

(10) Patent No.: US 12,714,033 B2
(45) Date of Patent: Aug. 25, 2026

(54) PLANT GROWTH LAMP, UV LAMP AND DRIPPING GLUE METHOD FOR MAIN LAMP STRIP

(71) Applicant: Grow Pros Solutions, Chino, CA (US)

(72) Inventors: Zhihui Long, Chino, CA (US); Duo Zhang, Chino, CA (US)

(73) Assignee: Grow Pros Solutions, Chino, CA (US)

( * ) Notice: Subject to any disclaimer, the term of this patent is extended or adjusted under 35 U.S.C. 154(b) by 0 days.

(21) Appl. No.: 19/023,749

(22) Filed: Jan. 16, 2025

(65) Prior Publication Data

US 2026/0198427 A1 Jul. 16, 2026

(51) Int. Cl.
*A01G 7/04* (2006.01)

(52) U.S. Cl.
CPC .................................... *A01G 7/045* (2013.01)

(58) Field of Classification Search
CPC ................................ A01G 7/045; A01G 9/249
USPC ...................................... 47/58.1 LS; 250/365
See application file for complete search history.

(56) References Cited

U.S. PATENT DOCUMENTS

2021/0330836 A1* 10/2021 Lane .......................... A61L 2/10
2022/0404006 A1* 12/2022 Zheng ................... F21V 23/003

FOREIGN PATENT DOCUMENTS

CN 215674886 U * 1/2022
CN 216314163 U * 4/2022

* cited by examiner

*Primary Examiner* — Keith G. Delahoussaye
(74) *Attorney, Agent, or Firm* — Hemisphere Law, PLLC

(57) ABSTRACT

A plant growth lamp includes a first bracket, a second bracket parallel with the first bracket, a supporter, a plurality of light emitting modules located between the first bracket and the second bracket and a power module electrically connected with the light emitting modules and installed on the first bracket and the second bracket. Each light emitting module includes a main light emitting component and an UV light emitting component arranged adjacent to each other. A first mounting frame is arranged on a first side surface of the first bracket, and an electrical female socket is arranged on a second side surface of the second bracket opposite to the first side surface. One end of the UV light emitting component is detachable and arranged on the first mounting frame, the other end includes a electrical male plug sliding relative to the electrical female socket.

17 Claims, 15 Drawing Sheets

PLANT GROWTH LAMP, UV LAMP AND DRIPPING GLUE METHOD FOR MAIN LAMP STRIP

TECHNICAL FIELD

The present disclosure belongs to the field of plant lamps, and more particularly to a plant growth lamp, an UV lamp and a dripping glue method for main lamp strips.

BACKGROUND

In the related technologies of commercially available plant lamp, the plant lamp only has a single light source strip, which irradiates the plant through a single light source to promote the growth of the plant. However, the efficiency of promoting plant growth of such plant lamps is low and does not meet the needs of customers.

This disclosure is designed with two different light source strips jointly irradiating, which are a main light source and an UV light source, to promote growth of plants. Since the life of the LED chip of the UV lamp strip is lower, and the failure rate of the UV lamp strip is higher relative to that of the main light source, it is needed to arrange the UV light source being detachable for easy replacement and maintenance. This disclosure designs a new plant lamp with two light sources, and it is convenient for users to disassemble the UV lamp strip and convenient to replace and maintain.

SUMMARY

The purpose of the present disclosure is to provide a plant growth lamp for illumination by two different light sources and to facilitate the removal and assembly of the luminous components of the UV lamp.

To achieve the above purposes, the present disclosure provides, on the one hand, a plant growth lamp including:

- a supporter, including a first bracket and a second bracket arranged at parallel intervals;
- a plurality of light emitting modules, the plurality of light emitting modules being arranged at intervals along a direction extended by the first bracket and being located between the first bracket and the second bracket;
- a power module, the power module being installed on the first bracket and the second bracket and being electrically connected with the light emitting modules;
- wherein each of the light emitting modules includes a main light emitting component and a UV light emitting component arranged adjacent to each other, a first side surface of the first bracket is opposite to a second side surface of the second bracket, a first mounting frame is arranged on the first side surface, and an electrical female socket is arranged on the second side surface; two ends of the UV light emitting component are respectively defined to be a first end and a second end, the first end is detachable and arranged on the first mounting frame through a first locking member, and the second end includes a electrical male plug sliding relative to the electrical female socket; the electrical male plug is inserted into the electrical female socket; two ends of the main light emitting component are respectively arranged on the first side surface and the second side surface; the power module is electrically connected to the electrical female socket and the main light emitting component.

The technical solution provided in the present disclosure is to irradiate the plant by setting up two different light components, and the UV emitting components thereof are easy to disassemble and assemble.

Optionally, a second mounting frame is arranged on the second side surface, the second mounting frame is used to support the second end of the UV light emitting component and is detachable connected to the second mounting frame and the second end by a locking member.

Through the above scheme, both ends of the UV emitting component can be stably fixed on the first mounting frame and the second mounting frame.

Optionally, the first mounting frame includes a fixed plate and an insert plate connected to the fixed plate, a slot is defined on the first end for inserting the insert plate, the fixed plate is fixed on the first side surface.

Through the above scheme, the UV emitting components can be prepositioned.

Optionally, the UV light emitting component includes a first lamp head, a second lamp head, a first cooling base and a UV lamp strip, the UV lamp strip is arranged on the first cooling base, the first lamp head and the second lamp head are respectively arranged at two ends of the first cooling base.

Optionally, the first lamp head includes a base housing and a sliding housing, the electrical male plug is fixed to and exposed from the sliding housing, the electrical male plug is slidably arranged on the base housing.

Through the scheme, the electrical male plug can slide relative to the electrical female socket, and then insert into or pull out from the electrical female socket.

Optionally, the base housing includes a first body shell, a groove cavity and two protruding walls, the groove cavity is defined on one side of the first body shell towards the first cooling base, the two protruding walls are spaced on the first body shell and extended towards the sliding housing; each protruding wall defines a card slot; the sliding housing comprises a second body shell, a sliding block and buckles, the sliding block is extended from the second body shell to the two protruding walls, and the sliding block is arranged between the two protruding walls, the buckles are slidably arranged in the card slots.

Optionally, the power module includes a main control box, plugs arranged at two opposite ends of the main control box, and dip switches installed on the plugs, the dip switch is used to adjust output power of the main control box.

Through the above scheme, the output power of the power module can be adjusted, and then the light output of the plant growth lamp can be adjusted.

Optionally, a mounting slot is defined on the sliding block for installing the electrical male plug.

Through the above scheme, the electrical male plug is fixed on the sliding block to move synchronously.

Optionally, a through hole communicated with the groove cavity is defined on the first body shell, and the UV lamp strip passes through the groove cavity and the through hole to connect to the electrical male plug by wires.

Through the above scheme, the wire can be convenient to pass through, so that the UV lamp strip is electrically connected with the electrical plug.

Optionally, the first cooling base is a plate reinforcement, a clamping slot is defined on the first cooling base to receive the UV lamp strip.

Through the above scheme, the UV lamp strip can be easily assembled.

Optionally, the main light emitting component includes a main light strip, a second cooling base, a third lamp head, and a fourth lamp head, the main light strip is arranged on the second cooling base, the third lamp head and the fourth lamp head are respectively arranged on two opposite side end of the second cooling base, the third lamp head is installed on the second side surface and the fourth lamp head is installed on the first side surface.

Optionally, the third lamp head is integrated with the second mounting frame.

Optionally, the first bracket and second bracket both include a plurality of long frames and a plurality of hinged assemblies, each hinged assembly includes two articulated connecting heads, the two connecting heads are respectively correspond to and connected to ends of two adjacent long frames, the two adjacent long frames are folded and expanded through the hinged assembly.

Through the above scheme, the first bracket and the second bracket can be folded and expanded each other through the hinged assemblies, which can reduce the size of the packaging box, reduce the packaging cost, and facilitate transportation.

Optionally, the number of the long frames is three, three long frames namely are a first strip, a second strip and a third strip which connected sequentially, the hinged assembly includes a first hinged module and a second hinged module, the first hinged module is arranged between the first strip and the second strip, the second hinged module is arranged between the second strip and the third strip, and the first strip is rotated relative to the second strip to fold and fit the second strip, the third strip is rotated relative to the second strip to fit the first strip.

Through the above scheme, it is easy to maintain the structural stability of the lamp during the loading process, and the reduced size of the folding state can maximize the saving of packaging materials.

Optionally, the first mounting frame, the supporter and the first locking member are all metal parts.

Through the above solution, the light strip can be grounded directly through the first mounting frame, the locking member, and the supporter without leading out ground cable.

In order to achieve the above purposes, the present disclosure also provides a UV lamp including:

a first bracket;

a second bracket arranged at an interval with the first bracket;

a UV light emitting component installed on the first bracket and the second bracket;

a power module installed on the first bracket and the second bracket;

wherein a first side surface of the first bracket is opposite to a second side surface of the second bracket, a first mounting frame is arranged on the first side surface, and an electrical female socket is arranged on the second side surface; two ends of the UV light emitting component are respectively defined to be a first end and a second end, the first end is detachable and arranged on the first mounting frame through a first locking member, and the second end includes a electrical male plug sliding relative to the electrical female socket; the electrical male plug is inserted into the electrical female socket; the power module is electrically connected to the electrical female socket.

Optionally, a second mounting frame is arranged on the second side surface, the second mounting frame is used to support the second end of the UV light emitting component and is detachable connected to the second mounting frame and the second end by a locking member; the first mounting frame includes a fixed plate and an insert plate connected to the fixed plate, a slot is defined on the first end for inserting the insert plate, the fixed plate is fixed on the first side surface.

Optionally, the UV light emitting component includes a first lamp head, a second lamp head, a first cooling base and a UV lamp strip, the UV lamp strip is arranged on the first cooling base, the first lamp head and the second lamp head are respectively arranged at two ends of the first cooling base.

Optionally, the first lamp head includes a base housing and a sliding housing, the electrical male plug is fixed to and exposed from the sliding housing, the electrical male plug is slidably arranged on the base housing; the base housing comprises a first body shell, a groove cavity and two protruding walls, the groove cavity is defined on one side of the first body shell towards the first cooling base, the two protruding walls are spaced on the first body shell and extended towards the sliding housing; each protruding wall defines a card slot; the sliding housing includes a second body shell, a sliding block and buckles, the sliding block is extended from the second body shell to the two protruding walls, and the sliding block is arranged between the two protruding walls, the buckles are slidably arranged in the card slots.

The application also relates to a dripping glue method for a main strip lamp, the main light strip includes a second substrate and a plurality of second LED lamp beads arranged on the second substrate, the plurality of second LED lamp beads are arranged in a direction of the length of the second substrate in more than one column; the dripping glue method includes:

arranging the second substrate with the second LED lamp beads on a second cooling base, and fixing the second substrate and the second cooling base;

automatically dripping glue by a dispensing machine; the dispensing machine having a plurality of glue nozzle, the glue nozzle being positioned on two opposite sides of the second LED lamp bead, and then driving the glue nozzle to move parallel and uniform along the direction of the length of the second substrate to cover glue on entire surface of the second substrate and exposing the luminous surface of the second LED lamp bead;

drying the glue.

BRIEF DESCRIPTION OF THE DRAWINGS

In order to more clearly illustrate the technical solutions of the embodiments of the present disclosure, the drawings used for illustrating the embodiments will be briefly described below. It is obvious that the following drawings merely illustrate some embodiments of the present disclosure. For those of ordinary skill in the art, other drawings can be obtained according to these drawings without any creative work.

DETAILED DESCRIPTION

Figure 1:
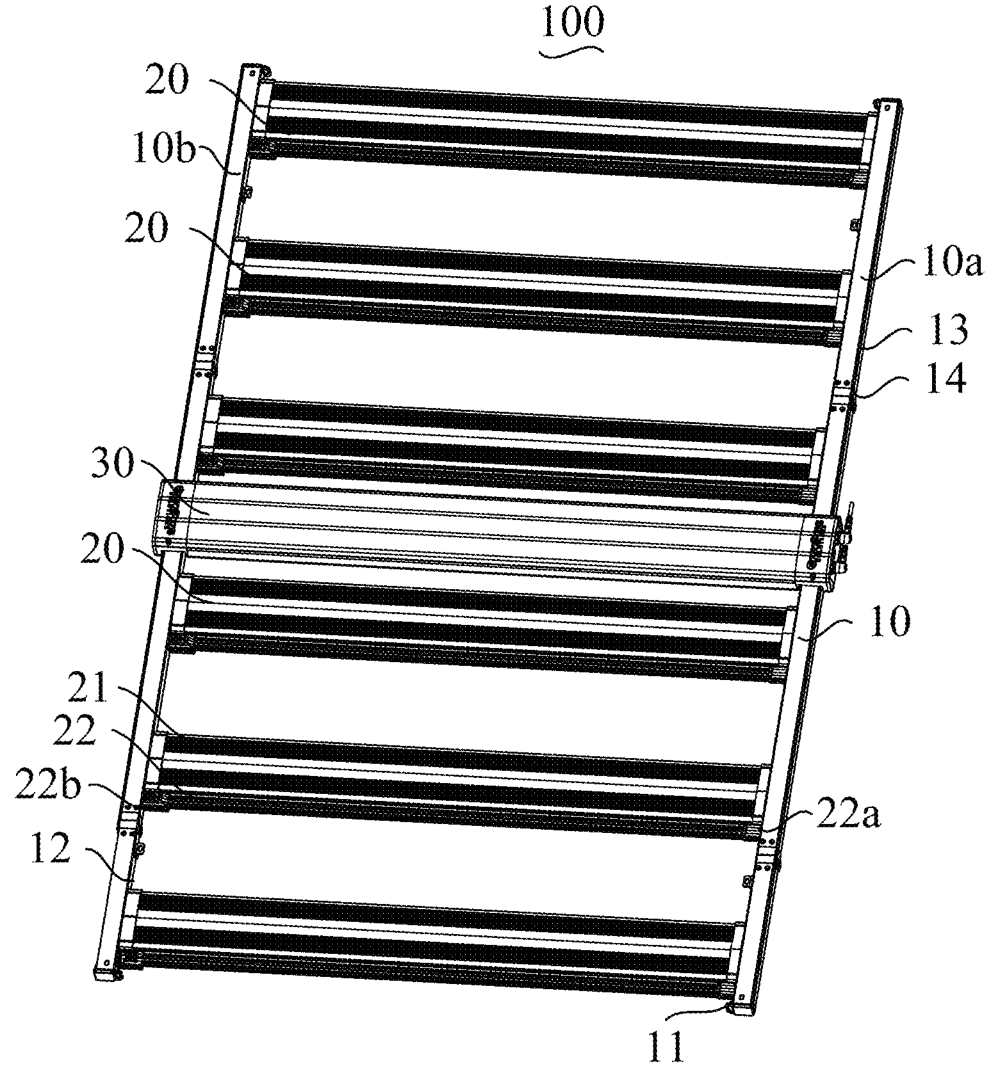
FIG. 1 illustrates a schematic diagram on one view of a plant growth lamp according to an embodiment of the present disclosure.
Figure 2:
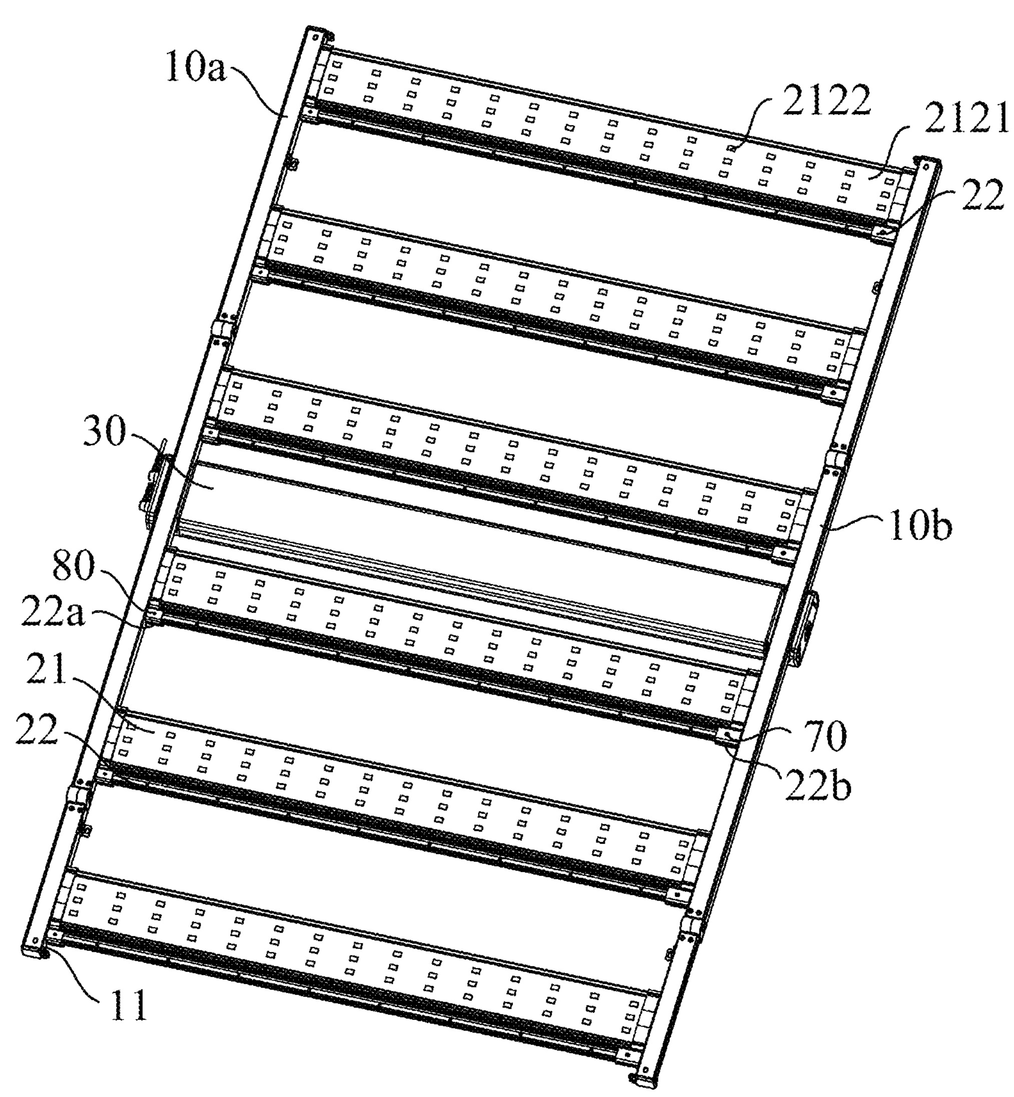
FIG. 2 illustrates a schematic diagram on another view of the plant growth lamp according to an embodiment of the present disclosure.

As shown in FIG. 1 to FIG. 4, an embodiment of the present disclosure provides a plant growth lamp 100 including a supporter 10, a plurality of light emitting modules 20 and a power module 30. The supporter 10 includes a first bracket 10*a* and a second bracket 10*b* arranged at parallel intervals, and the first bracket 10*a* and the second bracket 10*b* are both long strips. The first bracket 10*a* and the second bracket 10*b* are set at relative intervals. The plurality of light emitting modules 20 are arranged at intervals along a direction extended by the first bracket 10*a* and the second bracket 10*b*, and the plurality of light emitting modules 20 are located between the first bracket 10*a* and the second bracket 10*b*. The power module 30 is installed on the first bracket 10*a* and the second bracket 10*b* and is electrically connected with the light emitting modules 20. The power module 30 is used to connect to an external power supply to provide electrical energy for the light emitting modules 20.

Specifically, each of the light emitting modules 20 includes a light emitting component 21 and a UV light emitting component 22. Each of the main light emitting components 21 is corresponding with and arranged adjacent to one UV light emitting component 22. A first side surface 11 of the first bracket 10*a* is opposite to a second side surface12 of the second bracket 10*b*. A first mounting frame 40 is arranged on the first side surface 11, and an electrical female socket 50 is arranged on the second side surface 12. Two ends of the UV light emitting component 22 are respectively defined to be a first end 22*a* and a second end 22*b*. The first end 22*a* is detachable and arranged on the first mounting frame 40 through a first locking member 80, and the second end 22*b* includes a electrical male plug 221 sliding relative to the electrical female socket 50. The electrical male plug 221 is inserted into the electrical female socket 50. Two ends of the main light emitting component 21 are respectively defined to be a third end 21*a* and a fourth end 21*b*. The third end 21*a* is connected with the first side surface 11, and the fourth end 21*b* is connected with the second side surface 12. The power module 30 is electrically connected to the electrical female socket 50 and the main light emitting component 21.

The plant growth lamp 100 in the present disclosure has a plurality of main light emitting components 21 and a plurality of UV light emitting components 22, which can jointly irradiate plants with a variety of light sources and can improve the growth rate of plants. And in the present disclosure, the life and failure rate of LED chip of the UV light emitting components is taken into account, then the UV light emitting components 22 is arranged as a detachable structure to facilitate the replacement or maintenance of the UV light emitting components 22 in the later period when there is a problem.

In an optional embodiment, a second mounting frame 60 is arranged on the second side surface 12. The second mounting frame 60 is used to support the second end 22*b* of the UV light emitting component 22 and is detachable connected to the second mounting frame 60 and the second end 22*b* by a second locking member 70.

Specifically, in this embodiment, the first mounting frame 40 is detachable connected to the first end 22*a* of the UV light emitting component 22 through the first locking member 80, and the second mounting frame 60 is detachable connected to the second end 22*b* of the UV light emitting component 22 through the second locking member 70. In the present disclosure, two ends of the UV light emitting component 22 are detachable and respectively connecting to the first mounting frame 40 and the second mounting frame 60 through the first locking member 80 and the second locking member 70 to ensure the stable connection of the UV light emitting component 22 to the first bracket 10*a* and the second bracket 10*b*.

In an optional embodiment, the first locking member 80 can be a locking screw. The second locking member 70 can be a locking screw. The locking screws are used to detachable connect the two ends of the UV light emitting component 22 respectively with the two opposite surfaces of the first bracket 10*a* and the second bracket 10*b*, and then the UV light emitting component 22 is detachable and arranged on the first bracket 10*a* and the second bracket 10*b*. In this embodiment, a number of the first locking member 80 is one and a number of the second locking member 70 is also one, that is, each end of the UV light emitting component 22 is fixed by a locking screw, and the user only needs to install or remove a locking screw during assembly and disassembly operation, so it is convenient for the user to install and disassemble the UV light emitting component 22.

Figure 3:
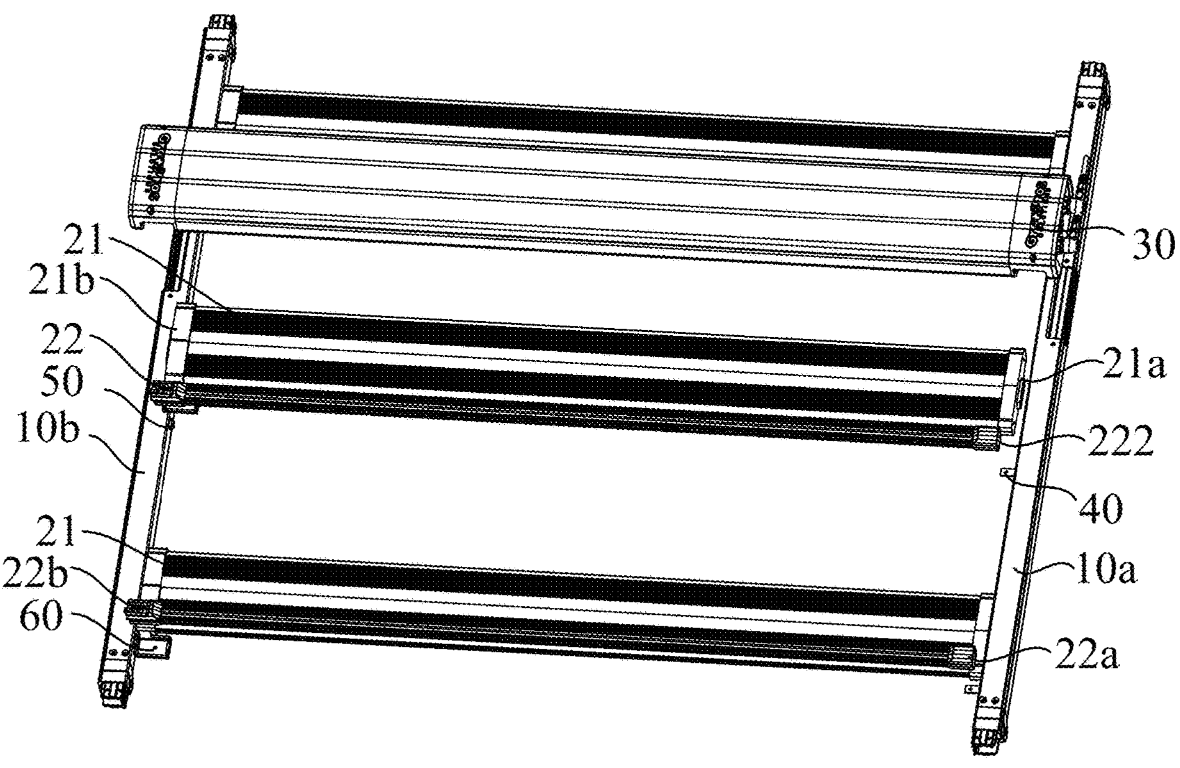
FIG. 3 illustrates a partial explosion diagram on one view of the plant growth lamp according to an embodiment of the present disclosure.
Figure 4:
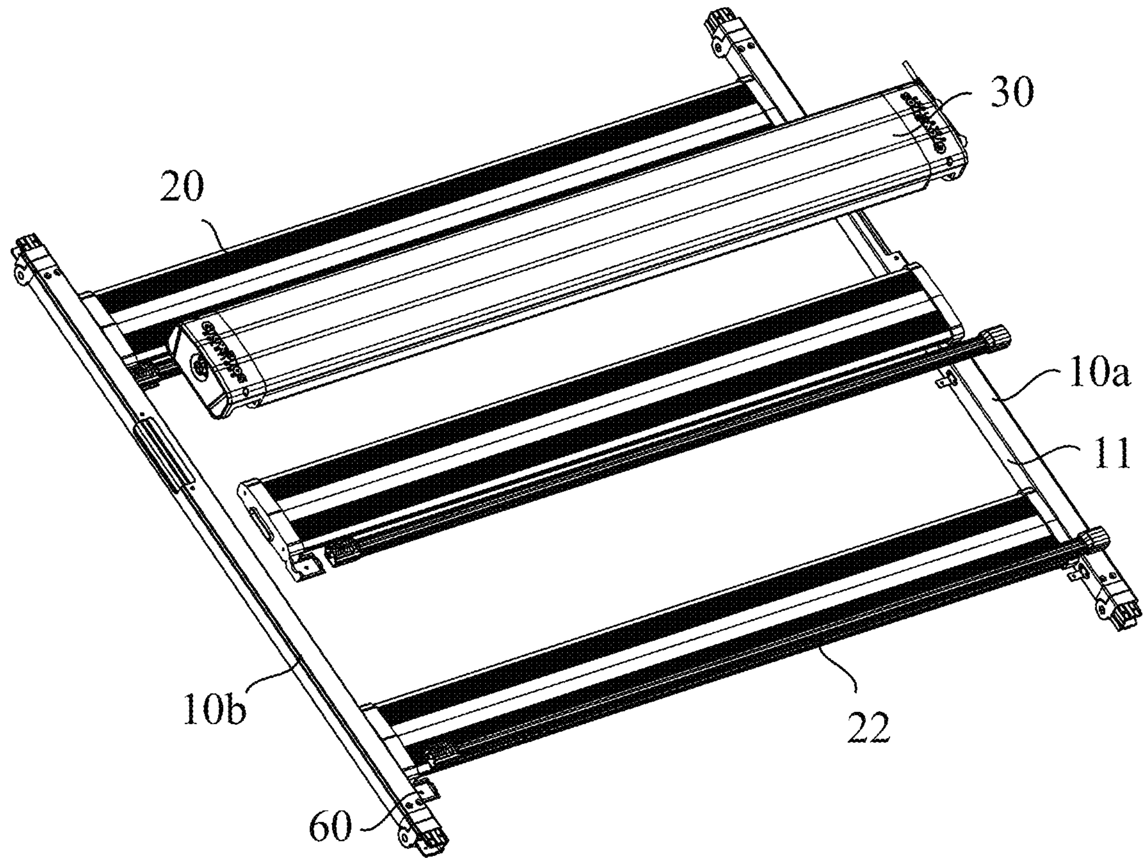
FIG. 4 illustrates a partial explosion diagram on another view of the plant growth lamp according to an embodiment of the present disclosure.
Figure 15:
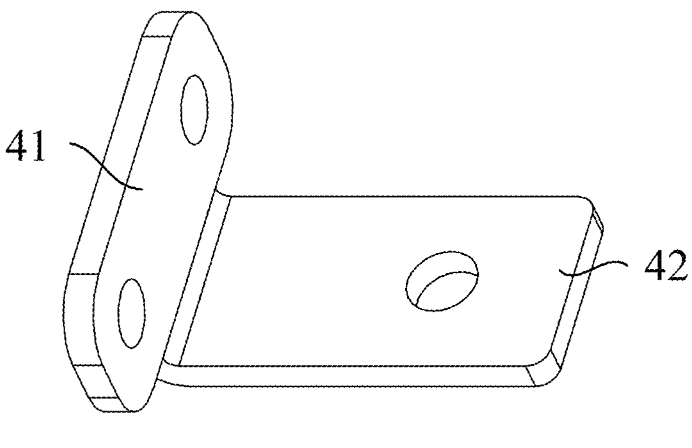
FIG. 15 illustrates a schematic diagram of a first mounting frame of the plant growth lamp according to an embodiment of the present disclosure.

In an optional embodiment, as shown in FIG. 3 and FIG. 15, the first mounting frame 40 includes a fixed plate 41 and an insert plate 42 connected to the fixed plate 41. A slot 222 is defined on the first end 22*a* for inserting the insert plate 42. The fixed plate 41 is fixed on the first side surface 11.

In particularly, the first mounting frame 40 is L-shaped. The fixed plate 41 is affixed to the second side surface 12 of the second bracket 10*b*, and the insert plate 42 extends from the second side surface 12 to the first side surface 11. The slot 222 is defined on the first end 22*a* of the UV light emitting component 22, and the slot 222 is used for inserting the insert plate 42. During assembly, the user first aligns the slot 222 with the insert plate 42 to insert the insert plate 42 into the first end 22*a* of the UV light emitting component 22 to initially position the first end 22*a* of the UV light emitting component 22, and then passes a locking screw through the first end 22*a* of the UV light emitting component 22 and the insert plate 42 to fix the first end 22*a* of the UV emitting component 22 on the insert plate 42. It is understood that the first end 22*a* of the insert plate 42 and the UV light component 22 both have threaded holes for the locking screw to pass through.

Figure 5:
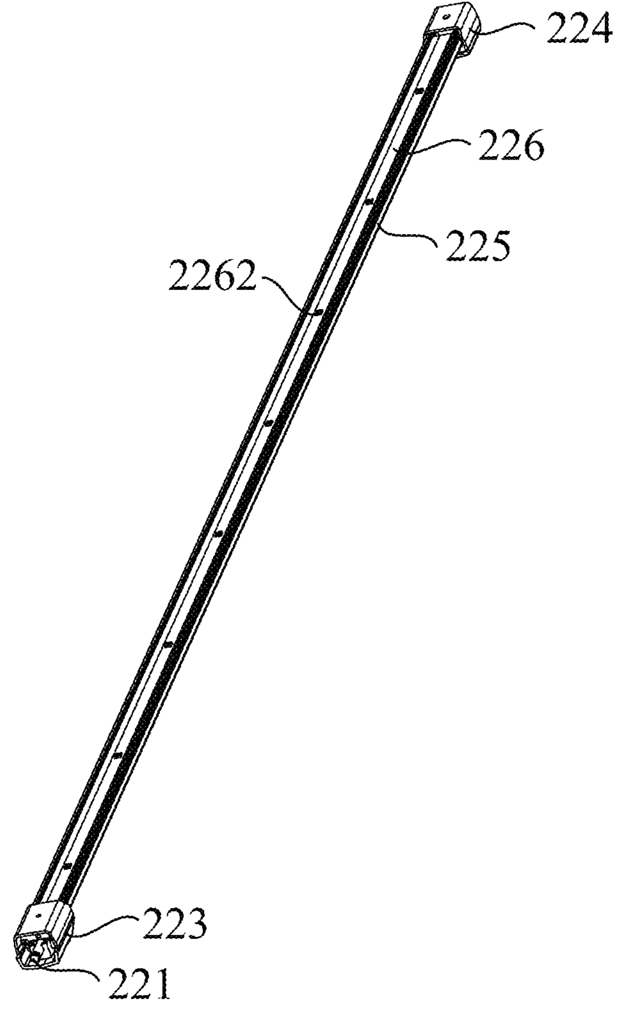
FIG. 5 illustrates a schematic diagram of an UV light emitting component of the plant growth lamp according to an embodiment of the present disclosure.
Figures 6, 7:
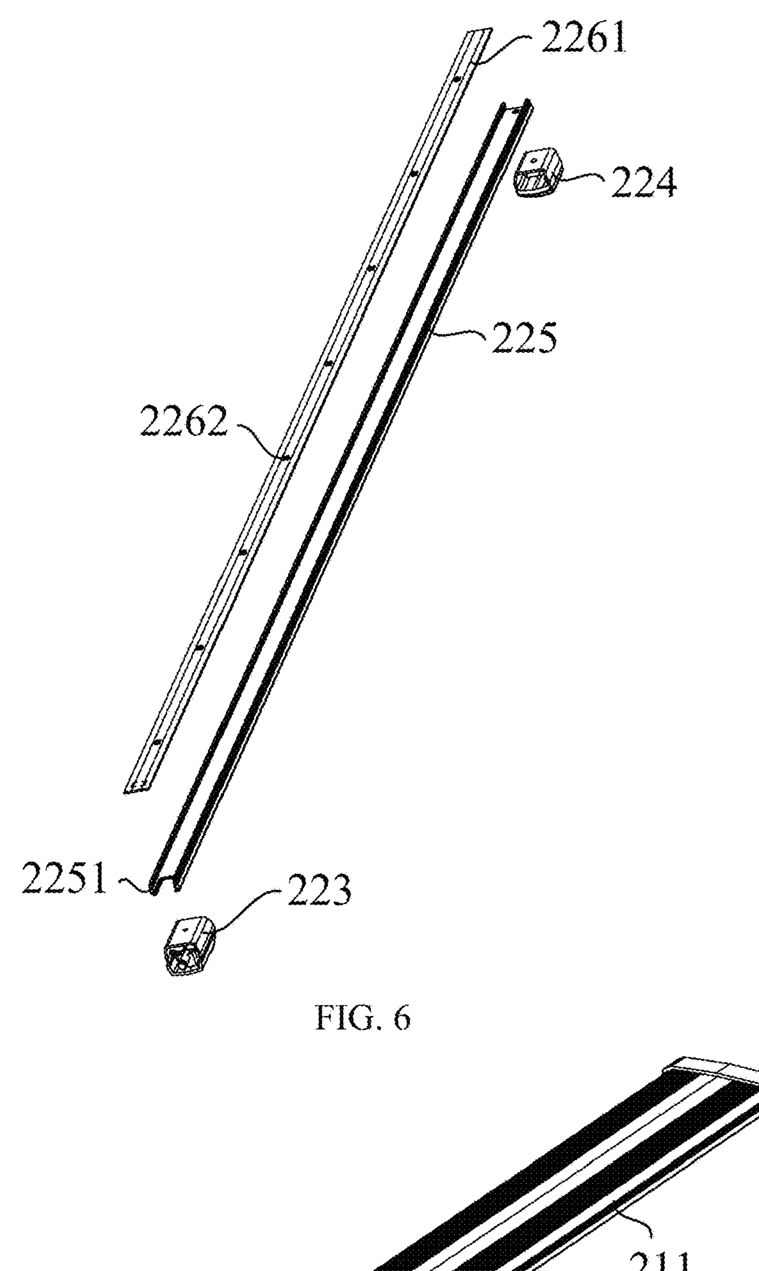
FIG. 6 illustrates an explosion diagram of the UV light emitting component of the plant growth lamp according to an embodiment of the present disclosure.
FIG. 7 illustrates an explosion diagram of a main light emitting component of the plant growth lamp according to an embodiment of the present disclosure.

As shown in FIGS. 5 and 6, the UV light emitting component 22 includes a first lamp head 223, a second lamp head 224, a first cooling base 225 and a UV lamp strip 226. The UV lamp strip 226 is arranged on the first cooling base 225, the first lamp head 223 and the second lamp head 224 are respectively arranged at two ends of the first cooling base 225.

Specifically, the first cooling base 225 is a plate reinforcement, in some embodiments, the first cooling base 225 is a plate reinforcement of aluminum profile. Heat transfer efficiency of aluminum is higher, lighting heat generated by the UV lamp strip 226 can be quickly conducted to the first cooling base 225, and then through thermal diffusion to dissipate to outside. The first cooling base 225 is a long strip, the UV lamp strip 226 is also a long strip, and the UV lamp strip 226 extends from one end of the first cooling base 225 to the other end of the first cooling base 225. A clamping slot 2251 is defined on the first cooling base 225 along its length direction, and the UV lamp strip 226 is arranged in the clamping slot 2251.

The UV lamp strip 226 includes a first substrate 2261 and a plurality of first LED lamp beads 2262, and the first LED lamp beads 2262 are evenly spaced along the direction of the length of the first substrate 2261 to emit uniform UV light to illuminate the plant.

In some optional embodiments, the UV strip 226 also includes glue covering the first substrate 2261, which does not immerse the surface of the first LED lamp bead 2262.

Specifically, in the present embodiment, the glue is applied to the surface of the first substrate 2261 by a drip glue process, and the glue covers part of the side surface of the first LED lamp bead 2262, but not immerses the luminous surface of the first LED lamp bead 2262. In present disclosure, the glue covers the surface of the first substrate 2261 and does not immerses the luminous surface of the first LED lamp bead 2262 for reducing optical loss. In the market, a lens is installed outside the lamp bead, and the light of the lamp bead is transmitted to outside through the lens, and the optical loss is large, so the light efficiency is low. In present disclosure, the first substrate 2261 is insulated by glue to prevent electric shock and can be waterproof and moisture-proof, and the first LED lamp bead 2262 can be fixed, which can reduce the damage probability of the first LED lamp bead 2262, and also reduce optical loss and improve light efficiency.

The specific drip glue process includes the following steps:

1. The first substrate 2261 with the first LED lamp beads 2262 will be installed on the first cooling base 225, and the first substrate 2261 and the first cooling base 225 will be fixed by a fixture.
2. The dispensing machine automatically drips glue. The dispensing machine has a plurality of glue nozzle, the glue nozzle is positioned on two opposite sides of the first LED lamp bead 2262, and then a transmission component of the dispensing machine drives the glue nozzle to move parallel and uniform along the direction of the length of the first substrate 2261 to cover glue on entire surface of the first substrate 2261. It should be noted that in the process of dripping glue, the flow rate of glue and the amount of glue are controlled to ensure that the glue is covered with the entire surface of the first substrate, and does not immerse the luminous surface of the first LED lamp bead. The glue is uniform, and the thickness of the glue is controlled at 0.5-0.65 mm. The first LED lamp head 2262 can be fixed on the first substrate 2261 by screws, which can be covered with glue.
3. The glue is dried. In the present disclosure, the glue is silicone, and the silicone is quick-drying adhesive that can be quickly dried.

Figure 9:
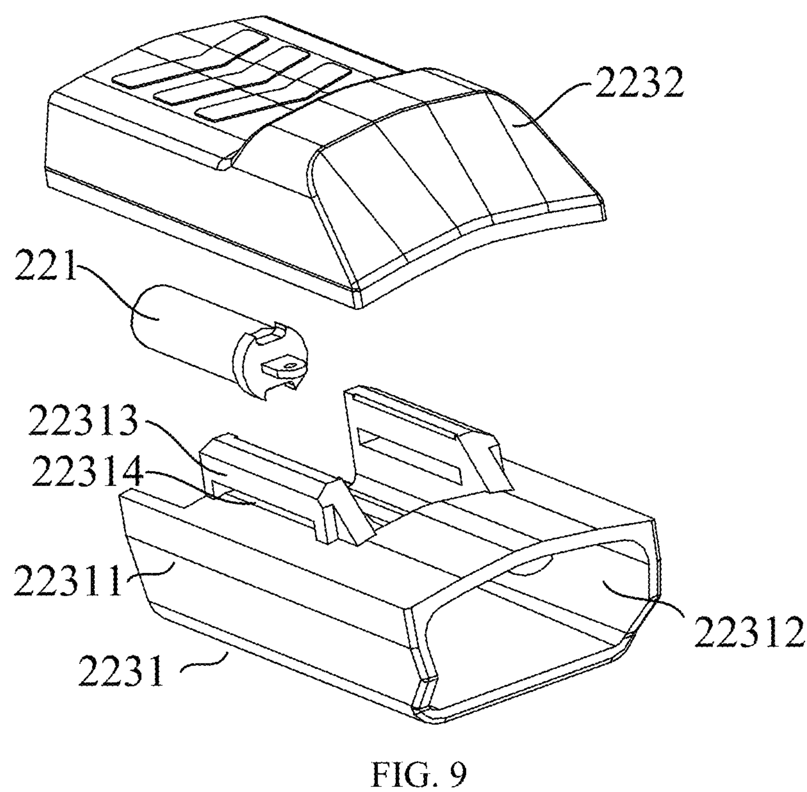
FIG. 9 illustrates an explosion diagram on one view of a first lamp head of the plant growth lamp according to an embodiment of the present disclosure.
Figure 10:
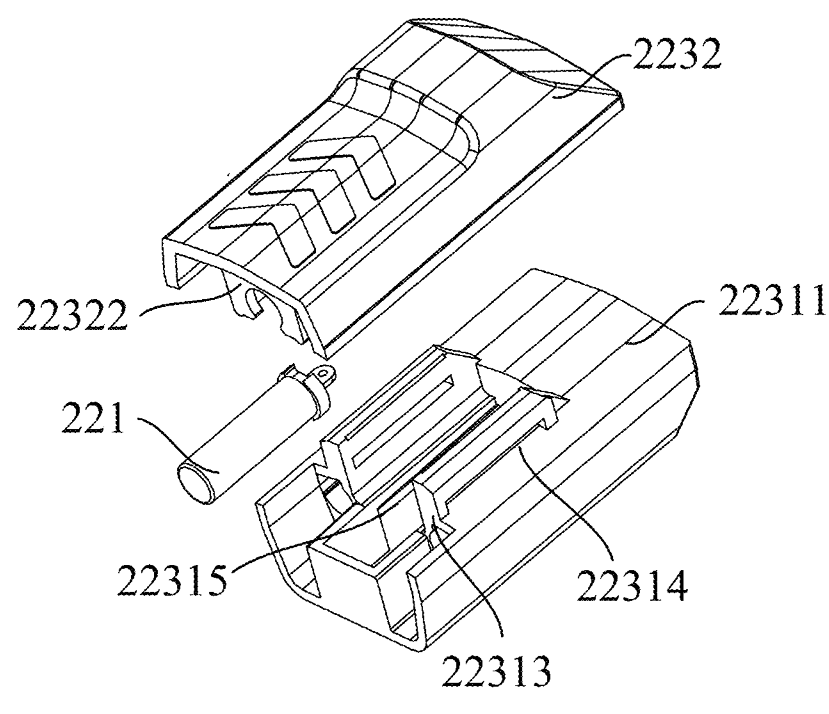
FIG. 10 illustrates an explosion diagram on another view of the first lamp head of the plant growth lamp according to an embodiment of the present disclosure.
Figure 11:
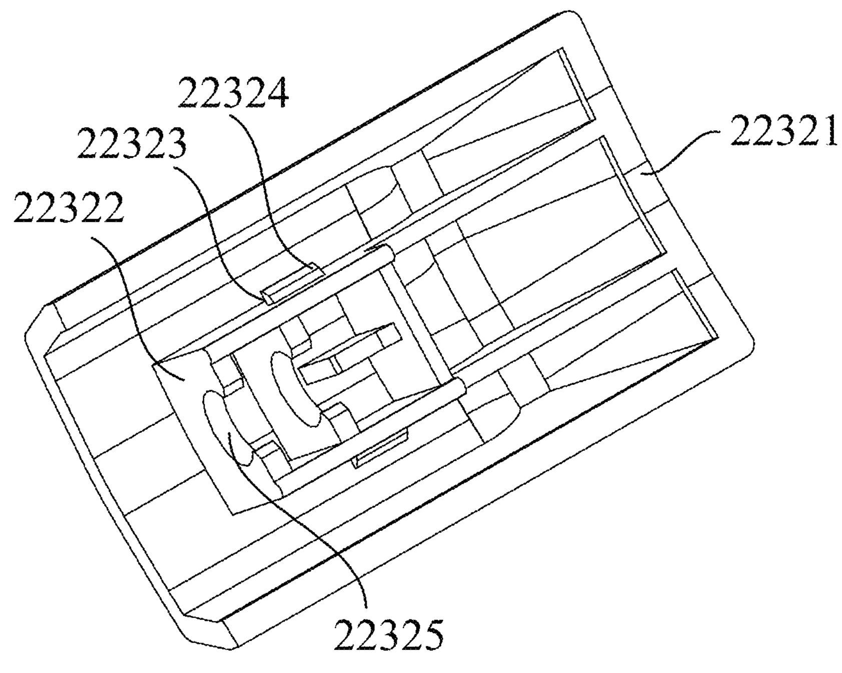
FIG. 11 illustrates a schematic diagram of a sliding housing of the plant growth lamp according to an embodiment of the present disclosure.
Figure 12:
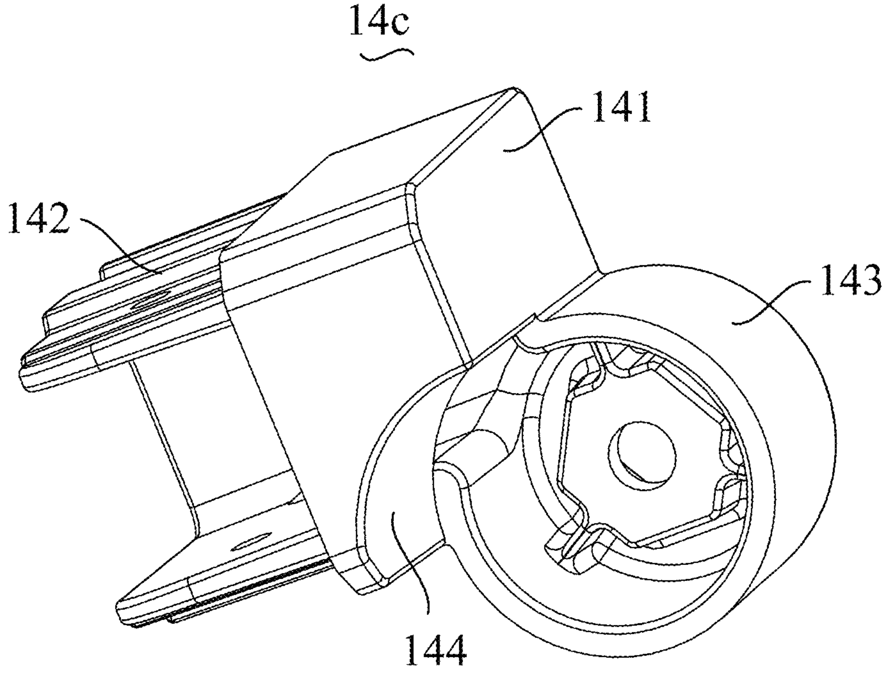
FIG. 12 illustrates a schematic diagram of a connector head of the plant growth lamp according to an embodiment of the present disclosure.
Figure 13:
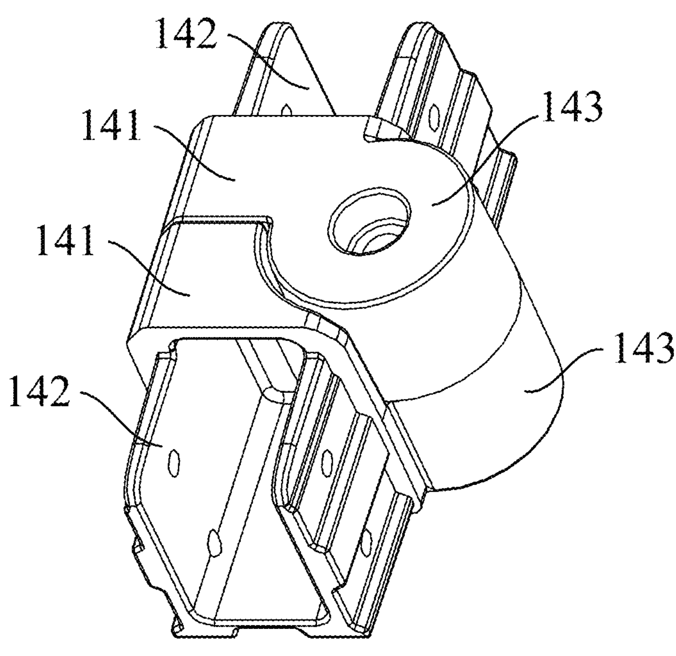
FIG. 13 illustrates a schematic diagram of the matching structure of two connector heads of the plant growth lamp according to an embodiment of the present disclosure.
Figure 14:
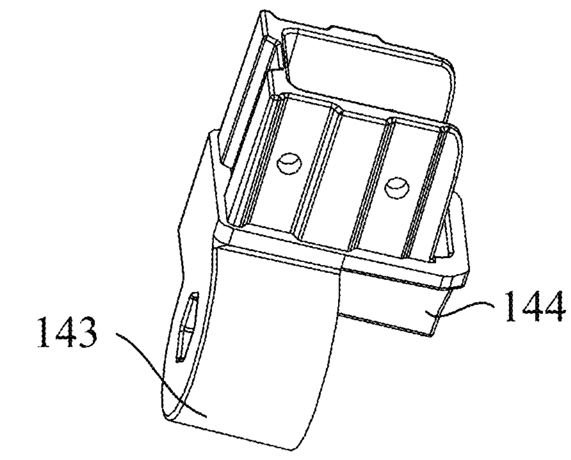
FIG. 14 illustrates an explosion diagram of the two connector heads of the plant growth lamp according to an embodiment of the present disclosure.
Figure 14:
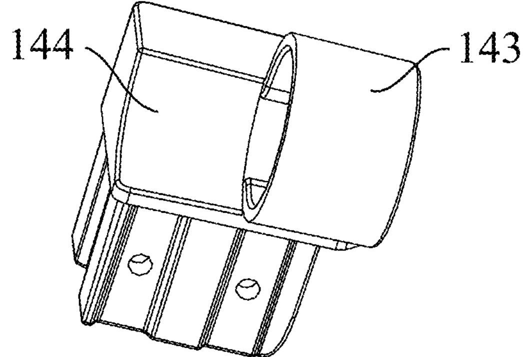

Referring to FIG. 9 to FIG. 11, in an optional embodiment, the first lamp head 223 includes a base housing 2231 and a sliding housing 2232. The electrical male plug 221 is fixed on and exposed from the sliding housing 2232. The sliding housing 2232 is slidably arranged on the base housing 2231.

In particular, the base housing 2231 is connected to the sliding housing 2232. The electrical male plug 221 is fixed on the sliding housing 2232 so that the electrical male plug 221 can move synchronously with the sliding housing 2232, and when in use the user pushes to the sliding housing 2232, the electrical male plug 221 can be driven to slide on the base housing 2231, and then move relative to the electrical female socket 50 to insert or pull out. The sliding housing 2232 is arranged on the base housing 2231, the base housing 2231 is placed on the second mounting frame 60, the second mounting frame 60 is supported on the base housing 2231, then the user can push the sliding housing 2232 above the UV light emitting component 22 to insert the electrical male plug 221 of the UV light emitting component 22 into the electrical female socket 50 on the second bracket 10*b*, to electrically connect the UV light emitting component 22 to the power module 30.

In the present disclosure, the first end 22*a* (according to the second lamp head 224) of the UV light emitting component 22 is firstly inserted into the insert plate 42 of the first mounting frame 40, and the second end 22*b* (according to the first lamp head 223) of the UV light emitting component 22 is placed on the second mounting frame 60 to initially position the UV light emitting component 22. Then a locking screw is passed through the second lamp head 224 and the insert plate 42 to fix the first end 22*a* of the UV light emitting component 22. Then another locking screw is passed through the first lamp head 223 and the second mounting frame 60 to fix the second end **22*b* of the UV light emitting component 22. The sliding housing 2232 of the first lamp head 223 is then pushed, the electrical male plug 221 is moved towards the electrical female socket 50 until it is inserted into the electrical female socket 50, so that the UV light emitting component 22 is assembled. When the UV light emitting component 22 doesn't work, the user first pushes the sliding housing 2232 of the first lamp head 223 to pull out the electrical male plug 221 from the electrical female socket 50 to turn the power off, and removes the two locking screws at two ends of the UV light emitting component 22 in turn, then pulls out the second lamp head 224 of the UV light emitting component 22 from the insert plate 42 of the first mounting frame 10, so that the UV light emitting component 22 can be completely removed. The UV light emitting module 22** of the present disclosure has simple structure and is convenient for user to assemble and disassemble.

As shown in FIG. 9 to FIG. 11, in an optional embodiment, the base housing 2231 includes a first body shell 22311, a groove cavity 22312 and two protruding walls 22313. The groove cavity 22312 is defined on one side of the first body shell 22311 towards the first cooling base 225. The two protruding walls 22313 are spaced on the first body shell 22311 and extended towards the sliding housing 2232. Each protruding wall 22323 defines a card slot 22314. The sliding housing 2232 includes a second body shell 22321, a sliding block 22322 and buckles 22323. The sliding block 22322 is extended from the second body shell 22321 to the two protruding walls 22313, and the sliding block 22322 is arranged between the two protruding walls 22313. The buckles 22323 can be slidably arranged in the card slots 22314.

Specifically, the two protruding walls 22313 on the base housing 2231 are arranged at intervals to form a slide rail for sliding the sliding block 22322 of the sliding housing 2232. The width of sliding block 22322 corresponds to the spacing between the two protruding walls 22313. Each card slot 22314 is defined on one protruding wall 22313, and each buckle 22323 of the sliding housing 2232 can be slidably arranged in one corresponding card slot 22314. The sliding housing 2232 is arranged on the two protruding walls 22313 of the base housing 2231 by the buckle 22323, and the extending length of the card slot 22314 is more than that of corresponding buckle 22323, so that the buckle 22323 can slide in the card slot 22314. When the user pushes the sliding housing 2232, the sliding block 22322 slides in the slide rail formed between the two protruding walls 22313, while each buckle 22323 slides in corresponding card slot 22314, and the sliding direction of the sliding housing 2232 is parallel to the direction of the length of the UV lamp. The electrical male plug 221 on the sliding housing 2232 slides horizontally with respect to the electrical female socket 50 on the second side surface 12 to insert or pull out the electrical female socket 50.

In an optional embodiment, as shown in FIG. 11, the buckle 22323 has a guide bevel 22324, which is used to facilitate the buckle 22323 to be stuck into the card slot 22314.

Refer again to FIG. 11, in an optional embodiment, a mounting slot 22325 is defined on the sliding block 22322 for installing the electrical male plug 221. In particular, the mounting slot 22325 can be two spaced circular grooves, and the electrical male plug 221 is fixed in the two circular grooves so that the electrical male plug 221 moves synchronously with the sliding housing 2232.

In an optional embodiment, as shown in FIG. 10, a through hole 22315 communicated with the groove cavity 22312 is defined on the first body shell 22311, and the UV lamp strip 226 passes through the groove cavity 22312 and the through hole 22315 to connect to the electrical male plug 221 by wires. In particular, the wires includes a positive wire and a negative wire, two end of the two wire are respectively connected to the positive and negative terminals of the first substrate 2261 of the UV light emitting component 22, the other two end of the two wire are respectively connected to the positive and negative terminals of the electrical male plug 221, and the two wires are connected to the electrical male plug 221 by passing through the groove cavity 22312 and the through hole 22315.

Figure 8:
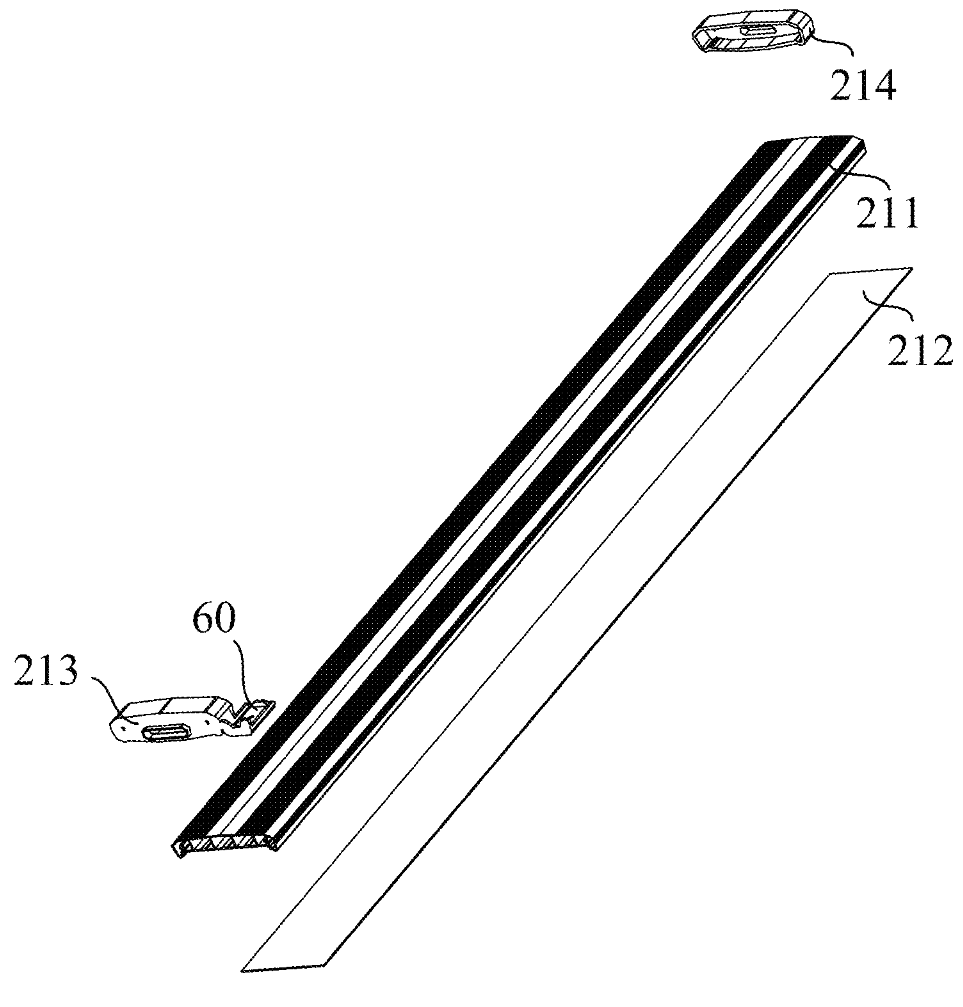
FIG. 8 illustrates an explosion diagram of the main light emitting component of the plant growth lamp according to an embodiment of the present disclosure.

Refer to FIG. 7 to FIG. 8, in an optional embodiment, the main light emitting component 21 includes a second cooling base 211, a main light strip 212, a third lamp head 213, and a fourth lamp head 214. Both the main light strip 212 and the second cooling base 211 are long strip structure, and the main light strip 212 is arranged on the second cooling base 211. The main light strip 212 is used to emitting light, and the light of the main light strip 212 can be selected according to the growth needs and the requirements of light intensity and spectral of plant. Two ends of the second cooling base 211 are respectively inserted into the third lamp head 213 and the fourth lamp head 214. The third lamp head 213 is installed on the second side surface 12 and the fourth lamp head 214 is installed on the first side surface 11. Baffles for blocking the wires of the main lamp strip 212 are arranged on the third lamp head and the fourth lamp head, and the baffles are arranged at the gap between the main lamp strip212 and the third lamp head 213, and the gap between the main lamp strip 212 and the fourth lamp head 214 to block the gaps.

As shown in FIG. 7, in an optional embodiment, the third lamp head 213 is integrated with the second mounting frame 60. In the present disclosure, the third lamp head 213 is fixed on the second side surface 12, and then the third lamp head 213 is integrated with the second mounting frame 60, so that it is no longer necessary to fix the second mounting frame 60, which can reduce the assembly process and reduce the assembly cost. In some embodiments, the third lamp head 213 and the second mounting frame 60 are injection molded integrally.

The main light strip 212 includes a second substrate 2121 and a plurality of second LED lamp bead 2122. The second LED lamp beads 2122 are arranged on the second substrate 2121 in column. In an optional embodiment, the plurality of second LED lamp beads 2122 are arranged in a direction of the length of the second substrate 2121 in more than one column. The main light strip 212 also includes glue covering the second substrate 2121. The main lamp strip 212 is also assembled by an drip glue process, which is the same as the drip glue process of the above UV lamp strip 226.

The specific drip glue process of the main lamp strip includes the following steps:

1. The second substrate 2121 with the second LED lamp beads 2122 will be installed on the second cooling base 211, and the second substrate 2121 and the second cooling base 211 will be fixed by a fixture.
2. The dispensing machine automatically drips glue. The dispensing machine has a plurality of glue nozzle, the glue nozzle is positioned on two opposite sides of the second LED lamp bead 2122, and then a transmission component of the dispensing machine drives the glue nozzle to move parallel and uniform along the direction of the length of the second substrate 2121 to cover glue on entire surface of the second substrate 2121. It should be noted that in the process of dripping glue, the flow rate of glue and the amount of glue are controlled to ensure that the glue is covered with the entire surface of the second substrate 2121, and does not immerse the luminous surface of the second LED lamp bead 2122. The glue is uniform, and the thickness of the glue is controlled at 0.5-0.65 mm. The second LED lamp head 2122 can be fixed to the second substrate 2121 by screws, which can be covered with glue.

3. The glue is dried. In the present disclosure, the glue is silicone, and the silicone is quick-drying adhesive that can be quickly dried.

As shown in FIG. 1, FIG. 12 to FIG. 14, in an optional embodiment, the first bracket 10*a* and second bracket 10*b* both include a plurality of long frames 13 and a plurality of hinged assemblies 14. The long frames 13 are sequentially arranged their length direction, and one of the hinged assemblies 14 is arranged between two adjacent long frames 13. The hinged assembly 14 includes two articulated connecting heads 14*c*, where one connecting heads 14*c* is connected to the end of one long frame 13, and the other connecting head 14*c* is fixed to the end of another long frame 13, and the two adjacent long frames 13 are folded and expanded through the hinged assembly 14. When the two adjacent long frames 13 are expanded to form a tiled strip to lay out the plurality of light emitting components mounted on the first bracket 10*a* and the second bracket 10*b*. When the two adjacent long frames 13 are folded, to reduce the length of the entire plant lamp, reduce the length of the packaging box, reduce the packaging cost, and facilitate transportation.

The connecting head 14*c* includes a cover body 141, a inserting part 142 and a fixing ring 143 connected with each other. The inserting part 142 is inserted into the end of the long frame 13. A curved groove 144 is defined on a lower end of the cover body 141. The fixing ring 143 is arranged in the curved groove 144, and the shape of the curved groove 144 is adapted to the shape of the fixing ring 143. The fixing ring 143 is communicated to the cover body 141.

In particular, the first bracket 10*a* has a same structure with the second bracket 10*b*. The first bracket 10*a* and second bracket 10*b* both include a plurality of long frames 13 and a plurality of connecting heads 14*c*. The two adjacent long frames 13 are connected together through two connection heads 14*c*. The two connecting heads 14*c* are faced to each other, and one of the connection heads 14*c* is fixed at the end of one of the long frame 13, the other connector head 14*c* is fixed to the end of another long frame 13, and the two connector heads 14*c* and the two long frames 13 are fixed together by bolts passing through the two connector heads 14*c*. The length of the curved groove 144 is twice that of the fixing ring 143, and the shape of the curved groove 144 is adapted to the shape of the fixing ring 143. During assembly, the fixing ring 143 of another connector head 14*c* is installed in the curved groove 144 of this connector head 14*c*, and the cover body 141 of the two connector 14*c* is contacted with each other, and the bolt is threaded through the two fixing rings 143 to fix the two connector head 14*c* together. The insertion parts 142 of the two connection heads 14*c* can be respectively fixed on two long frames 13 by screws, so that the two long frames 13 and the two connection heads 14*c* can be fixed together. The fixed ring 143 is communicated to the cover body 141. In this embodiment, wire are required to be arranged inside the long frame 13 to electrically connect the wire to the power module 30. Therefore, the fixed ring 143 is communicated to the cover body 141 so that a space is formed between the two connection heads 14*c* for the wire to pass through. It is understood that the long frame 13 in the present disclosure may be assembled to facilitate the threading of wires inside the long frame 13.

It should be noted that the long frame 13 in the present disclosure can be set according to actual requirements. The long frame 13 located at the end of the first bracket 10*a* and the second bracket 10*b* can be blocked by the cover plate to protect the end of the first bracket 10*a* and the second bracket 10*b*.

Figure 17:
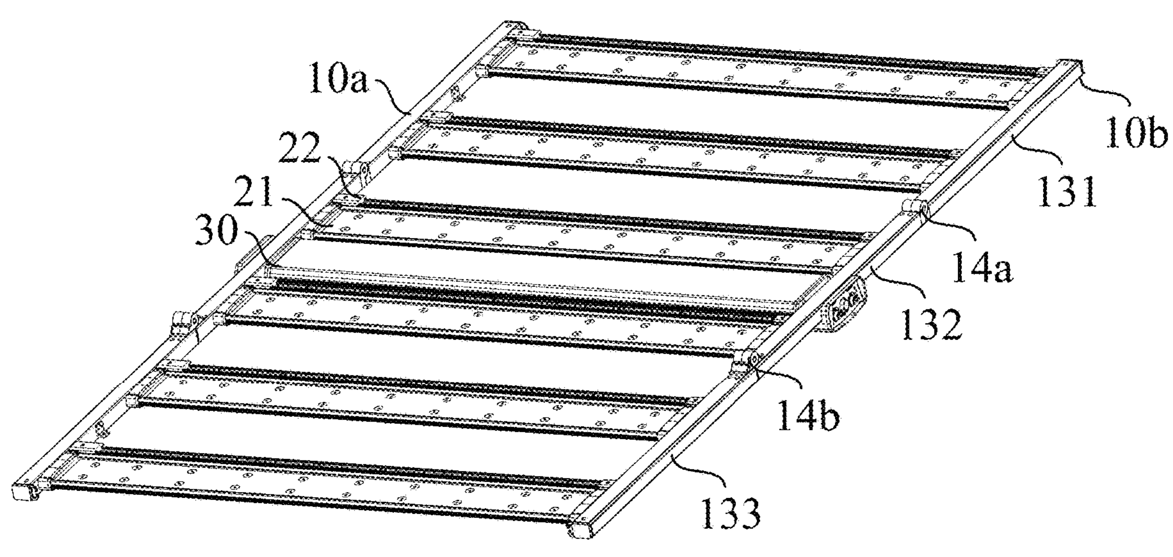
FIG. 17 illustrates a schematic diagram of the expanded state structure of the plant growth lamp according to an embodiment of the present disclosure.
Figure 18:
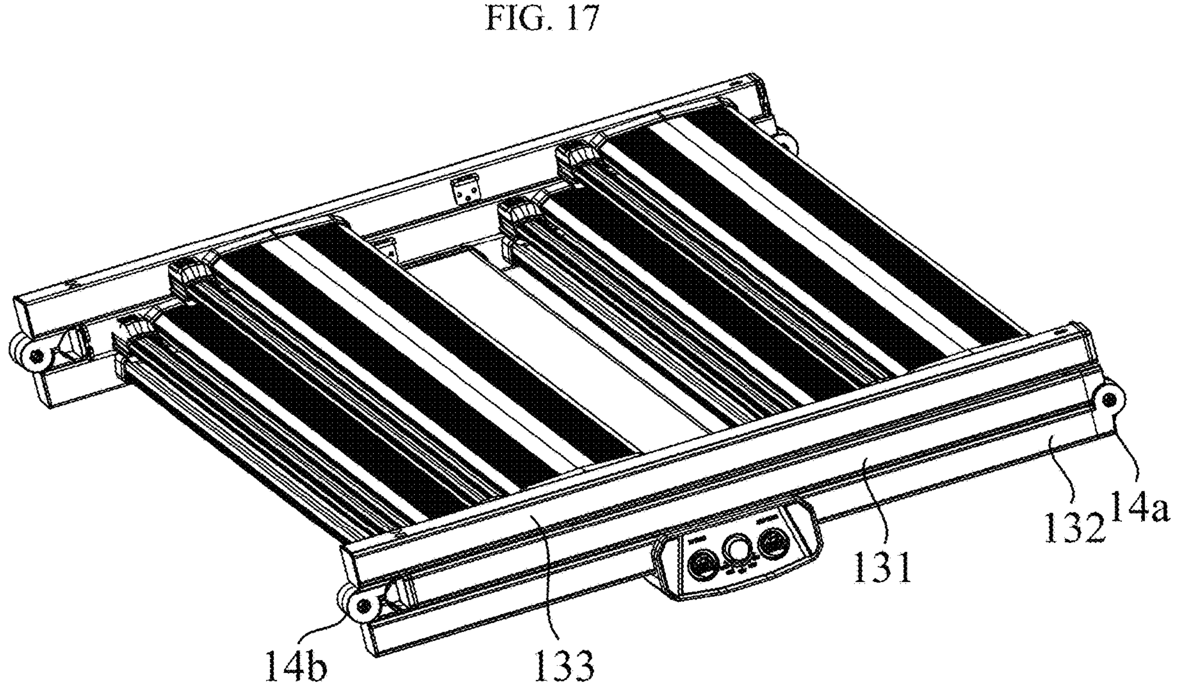
FIG. 18 illustrates a schematic diagram of the folding state structure of the plant growth lamp according to an embodiment of the present disclosure.
Figure 19:
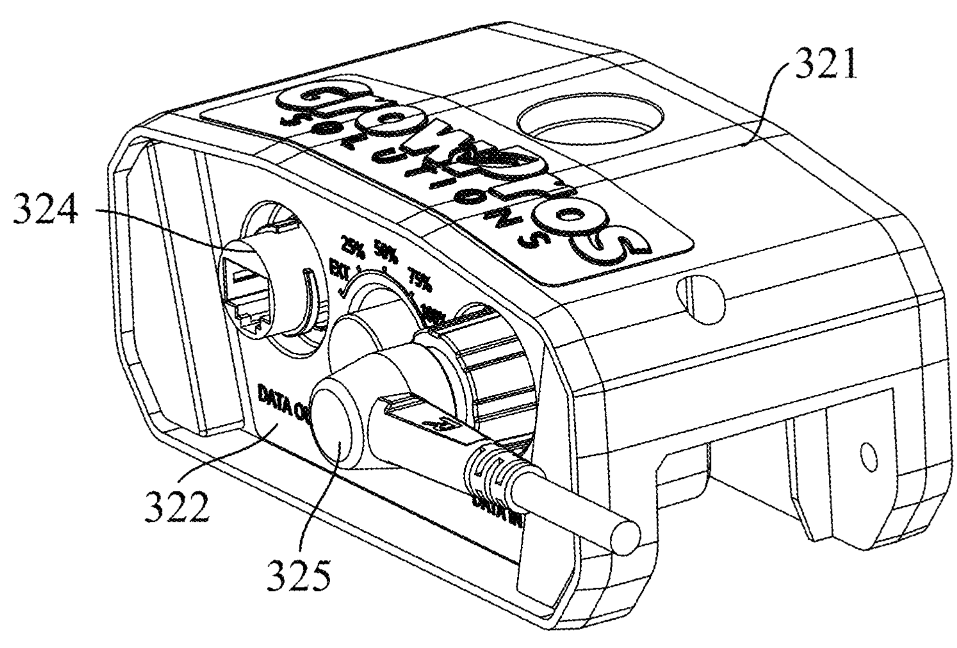
FIG. 19 illustrates a schematic diagram of a plug of the plant growth lamp according to an embodiment of the present disclosure.
Figure 20:
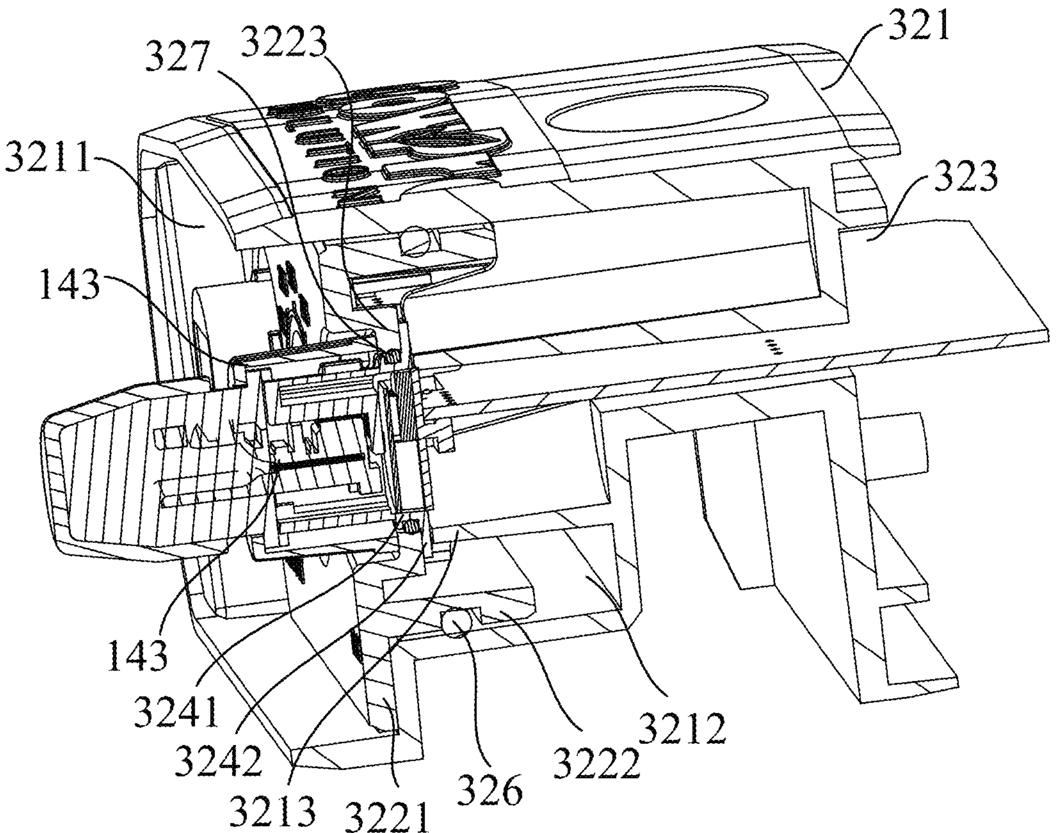
FIG. 20 illustrates a schematic section diagram of the plug of the plant growth lamp according to an embodiment of the present disclosure.
Figure 21:
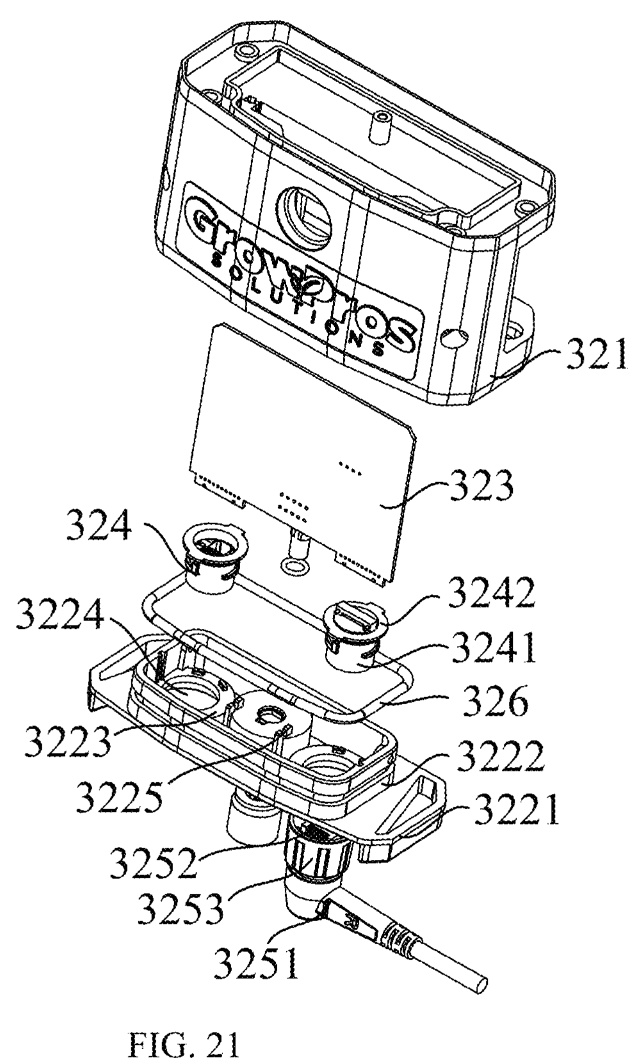
FIG. 21 illustrates an explosion diagram on one view of the plug of the plant growth lamp according to an embodiment of the present disclosure.
Figure 22:
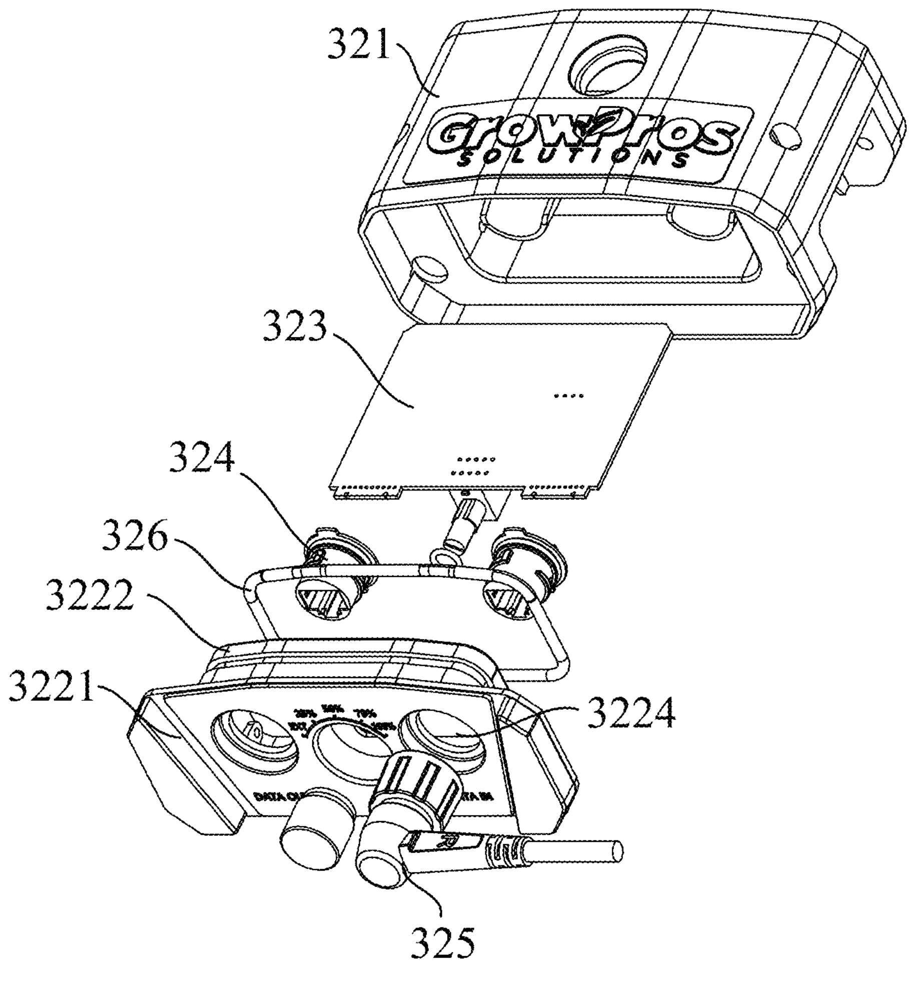
FIG. 22 illustrates an explosion diagram on another view of the plug of the plant growth lamp according to an embodiment of the present disclosure.

As shown in FIG. 17 and FIG. 18, in another optional embodiment, the number of the long frames 13 is three, three long frames namely are a first strip 131, a second strip 132 and a third strip 133 connected sequentially. The hinged assembly 14 includes a first hinged module 14*a* and a second hinged module 14*b*. The first hinged module 14*a* is arranged between the first strip 131 and the second strip 132, the second hinged module 14*b* is arranged between the second strip 132 and the third strip 133, and the first strip 131 is rotated relative to the second strip 132 to fold and fit the second strip 132. The third strip 133 is rotated relative to the second strip 132 to fit the first strip 131.

Specifically, long frame 13 is set as three, and the three long frame 13 are the first strip 131, the second strip 132 and the third strip 133 connected in sequence. The hinged assembly 14 includes a first hinged module 14*a* and a second hinged module 14*b*, the first hinged module 14*a* is connected to both ends of the first strip 131 and the second strip 132 near each other, and the first strip 131 can be folded and expanded relative to the second strip 132 through the first hinged module 14*a*, when the first strip 131 and the second strip 132 are expanded, Forming a long strip shape, when the first strip 131 and the second strip 132 are folded, the first strip 131 and the second strip 132 are set above and below, and the first strip 131 is fitted to the second strip 132.

The second hinged module 14*b* is connected to two faced ends of the second strip 132 and the third strip 133, and the third strip 133 can be folded and expanded relative to the second strip 132 through the second hinged module 14*b*. When the third strip 133 and the second strip 132 are expanded, a long strip head is formed, and when the third strip 133 and the second strip 132 are folded, the third strip 133 is fitted to the first strip 131 so that the first strip 131, the second strip 132 and the third strip 133 are overlapping. In the present disclosure, the using of the above structure can facilitate the loading process, maintain the stability of the lamp structure, and this folding state can reduce the size of the entire device to the greatest extent, so it can save the material of the packaging box to the greatest extent, and greatly reduce the packaging cost.

Figure 16:
FIG. 16 illustrates a schematic diagram of a power module of the plant growth lamp according to an embodiment of the present disclosure.

In an optional embodiment, as shown in FIG. 16, the power module 30 includes a main control box 31, plugs 32 arranged at two opposite ends of the main control box 31, and dip switches 33 installed on the plugs. The dip switches 33 are used to adjust output power of the main control box 31, and the light output of the plant growth lamp can be adjusted by turning the dip switches 33.

As shown in FIG. 19 to FIG. 22, in an optional embodiment, the plug 32 includes an end cover 321, a fixing block 322, a PCB board 323, a RJ45 socket 324 and a RJ45 plug 325. One end of the end cover 321 is connected to the main control box31, and the fixing block 322 is arranged on the other end of the end cover 321. The fixing block 322 is used to fix the RJ45 socket 324 in the end cover 321, and the RJ45 plug 325 is inserted into the RJ45 socket 324 to connect to outside. The PCB board 323 is arranged in the end cover 321 and the RJ45 socket 324 is welded on the PCB board 323.

Specifically, in the present embodiment, the fixing block 322 includes a flat panel 3221 and a protruding ring 3222 arranged on the flat panel 3221. A first mounting chamber 3211 and a second mounting chamber 3212 are defined on one end of the end cover 321 towards the fixing block 322, and the second mounting chamber 3212 is disposed on the bottom wall of the first mounting chamber 3211. The first mounting chamber 3211 is used to place the flat panel 3221, and the second mounting chamber 3212 is used to insert the protruding ring 3222. The protruding ring 3222 is covered with a first sealing ring 326, and the first sealing ring 326 is used to seal the gap between the protruding ring 3222 and the side wall of the second mounting chamber 3212.

At least one protruding pillar 3223 is formed in one side of the protruding ring 3222 of fixed block 322 towards the end cover 321. A through via 3224 is defined in the protruding pillar 3223. The RJ45 socket 324 includes a cylindrical body 3241 and a flange side 3242 arranged on an end of the cylindrical body 3241. The cylindrical body 3241 is passed through the through via 3224 and protruded from the fixing block 322 for the RJ45 plug 325 to be connected externally. A positioning plate 3213 is arranged in the second mounting chamber 3212, and the flange side 3242 is sandwiched between the protruding pillar 3223 and the positioning plate 3213. A second sealing ring 327 is jacketed on the cylindrical body 3241 to seal the gap between the cylindrical body 3241 and the through via 3224.

A first clamping groove 3225 is defined in the protruding ring 3222 for clamping the PCB board 323. A end of the RJ45 socket 324 facing the PCB board 323 is welded on the PCB board 323. The PCB board 323 is extended from one side of the first clamping groove 3225 to the second mounting chamber 3212, and a second clamping groove (not shown in the figure) for clamping the PCB board 323 is defined in the second mounting chamber 3212. When assembling the plug 32, the RJ45 socket 324 can be firstly weld on the PCB board 323, then the column body 3241 of the RJ45 socket 324 can be passed through the through via 3224 of the fixed block 322, and one end of the PCB board 323 can be insert into the first clamping groove 3225 on the fixed block 322 to initially position the RJ45 socket 324 and the PCB board 323. Then the other end of the PCB board 323 can be insert into the second mounting chamber 3212 of the end cover 321, and clamped into the second second clamping groove until the flange of the RJ45 socket 324 is connected to the positioning plate 3213 in the second mounting chamber 3212, and finally the screw is passed through the end cover 321 and the fixing block 322 to fix the end cover 321 and the fixing block 322.

The RJ45 plug 325 is used to connect the RJ45 socket 324. The RJ45 plug 325 includes connecting wires 3251, a plug part 3252 and a rubber shell 3253. The connecting wires 3251 are connected to the plug part 3252, the rubber shell 3253 is arranged outside of the plug part 3252, and rubber shell 3253 is defined with internal thread on the inner surface, the outer wall of the cylindrical body 3241 of the RJ45 socket 324 is defined with external threads. During installation, the plug part 3252 is insert into the cylindrical body 3241, and then the rubber shell 3253 is rotated to fix the RJ45 plug 325. A third sealing ring is also arranged inside the rubber shell 3253. The third sealing ring is used to seal the gap between the plug part 3252 and the cylindrical body 3241.

In an optional embodiment, the first mounting frame 60, the first locking member 80, and the supporter 10 are all metal. The UV light emitting components 22 need to meet the safety grounding performance, when the first mounting frame 60 is non-conductor, a ground wire leading from the UV light emitting component 22 and conducting with the supporter 10 is needed to achieve grounding requirements. In the present disclosure, the first mounting frame 60, the first locking member 80, and the supporter 10 are directly set as metal parts to simplify the ground connection.

As shown in FIG. 1 to FIG. 4, the present disclosure also relates to an UV lamp, including a first bracket **10*a*, a second bracket 10*b*, a power module 30 and a UV light emitting component 22. The first bracket 10*a* and the second bracket 10*b* is arranged at intervals. The power module 30 is installed on the first bracket 10*a* and the second bracket 10*b*. The UV light emitting component 22 is arranged between the first bracket 10*a* and the second bracket 10*b*. Where, two opposite side surfaces of the first bracket 10*a* and the second bracket 10*b* are respectively the first side surface 11 and the second side surface 12. A first mounting frame 40 is arranged on the first side surface 11, and an electrical female socket 50 is arranged on the second side surface 12. Two ends of the UV light emitting component 22 are respectively defined to be a first end 22*a* and a second end 22*b*. The first end 22*a* is detachable and arranged on the first mounting frame 40 through a first locking member 80, and the second end 22*b* includes a electrical male plug 221 sliding relative to the electrical female socket 50. The electrical male plug 221 is inserted into the electrical female socket 50. The power module 30 is electrically connected to the electrical female socket 50**.

In an optional embodiment, a second mounting frame 60 is arranged on the second side surface 12. The second mounting frame 60 is used to support the second end **22*b* of the UV light emitting component 22 and is detachable connected to the second mounting frame 60 and the second end 22*b* by a second locking member 70**.

In an optional embodiment, the first mounting frame 40 includes a fixed plate 41 and an insert plate 42 connected to the fixed plate 41. The first end **22*a* defines a slot 222 for inserting the insert plate 42. The fixed plate 41 is fixed on the first side surface 11**.

In an optional embodiment, the UV light emitting component 22 includes a first lamp head 223, a second lamp head 224, a first cooling base 225 and a UV lamp strip 226. The UV lamp strip 226 is installed on the first cooling base 225, and the first lamp head 223 and the second lamp head 224 are respectively arranged at two ends of the first cooling base 225.

The first lamp head 223 includes a base housing 2231 and a sliding housing 2232. The electrical male plug 221 is fixed to and exposed from the sliding housing 2232, which is slidably arranged on the base housing 2231.

In an optional embodiment, the base housing 2231 includes a first body shell 22311, a groove cavity 22312 and two protruding walls 22313. The groove cavity 22312 is defined on one side of the first body shell 22311 towards the first cooling base 225. The two protruding walls 22313 are spaced on the first body shell 22311 and extended towards the sliding housing 2232. Each protruding walls 22323 defines a card slot 22314. The sliding housing 2232 includes a second body shell 22321, a sliding block 22322 and buckles 22323. The sliding block 22322 extends from the second body shell 22321 to the two protruding walls 22313, and the sliding block 22322 is arranged between the two protruding walls 22313. The buckles 22323 can be slidably arranged in the card slots 22314.

In an optional embodiment, the application also includes a dimming module for performing a dimming operation. In the process of plant growth, four dimming can be carried out to adjust the appropriate light according to the light required at different stages of plant growth to promote the growth rate of plants at different stages. It should be noted that the dimming module can be automatic dimming or manual dimming. Among them, the terms "up" and "down" are used to describe the relative position relationship of each structure in the attached drawings, only for the sake of clarity of description, and not to limit the scope of implementation of the present disclosure. Changes or adjustments in the relative relationship shall also be regarded as the scope of implementation of the present disclosure without material changes in technical content.

For the purposes of the present disclosure, unless expressly stated and limited otherwise, the first feature "above" or "below" the second feature may be a direct contact between the first and second features, or an indirect contact between the first and second features through an intermediate medium. Moreover, the first feature is "above", "above" and "above" the second feature, but the first feature is directly above or diagonally above the second feature, or simply indicates that the first feature is higher in level than the second feature. The first feature "below", "below", and "below" the second feature can mean that the first feature is directly below or diagonally below the second feature, or simply means that the first feature is less horizontal than the second feature. In addition, if the word "and/or" or "and/or" appears in the whole text, its meaning includes three parallel schemes, such as "A and/or B", including scheme A, or scheme B, or scheme A and B meet at the same time.

In addition, in the present disclosure, unless expressly specified and limited otherwise, the terms "installation", "connection", "connection", "fixed" and other terms shall be understood broadly, for example, may be fixed connections, may be removable connections, or may be integrated; It can be directly connected, it can also be indirectly connected through an intermediate medium, it can be the connection within the two components or the interaction between the two components. For persons of ordinary skill in the field, the specific meaning of the above terms in the present disclosure may be understood on a case-by-case basis.

In the description of this specification, the reference terms "an embodiment", "some embodiments", "illustrative embodiments", "examples", "specific examples", or "some examples", etc., are used to refer to specific features, structures, materials, or features incorporated in the embodiment or description of the example contained in at least one embodiment or example of this disclosure. In this specification, schematic representations of the above terms do not necessarily refer to identical embodiments or examples. Further, the specific features, structures, materials or features described may be combined in a suitable manner in any one or more embodiments or examples.

Finally, it should be noted that the above embodiments are used only to illustrate the technical solution of the present disclosure, and not to restrict it; Notwithstanding the detailed description of the present disclosure by reference to the foregoing embodiments, it should be understood by persons of ordinary skill in the art that they may modify the technical scheme described in the foregoing embodiments, or make equivalent substitutions for some or all of the technical features thereof; Such modification or replacement shall not remove the essence of the corresponding technical scheme from the scope of the technical scheme of each embodiment of the present disclosure.

What is claimed is:

1. A plant growth lamp, comprising:

a supporter, comprising a first bracket and a second bracket arranged at parallel intervals;

a plurality of light emitting modules, the plurality of light emitting modules being arranged at intervals along a direction extended by the first bracket and being located between the first bracket and the second bracket; and a power module, the power module being installed on the first bracket and the second bracket and being electrically connected with the light emitting modules; wherein each of the light emitting modules comprises a main light emitting component and a UV light emitting component arranged adjacent to each other, a first side surface of the first bracket is opposite to a second side surface of the second bracket, a first mounting frame is arranged on the first side surface, and an electrical female socket is arranged on the second side surface; two ends of the UV light emitting component are respectively defined to be a first end and a second end, the first end is detachable and arranged on the first mounting frame through a first locking member, and the second end comprises an electrical male plug sliding relative to the electrical female socket; the electrical male plug is inserted into the electrical female socket; two ends of the main light emitting component are respectively arranged on the first side surface and the second side surface; and the power module is electrically connected to the electrical female socket and the main light emitting component; and wherein the first mounting frame comprises a fixed plate and an insert plate connected to the fixed plate, a slot is defined on the first end for inserting the insert plate, the fixed plate is fixed on the first side surface.

2. The plant growth lamp of claim 1, wherein a second mounting frame is arranged on the second side surface, the second mounting frame is used to support the second end of the UV light emitting component and is detachable connected to the second end by a second locking member.

3. The plant growth lamp of claim 1, wherein the UV light emitting component comprises a first lamp head, a second lamp head, a first cooling base and a UV lamp strip, the UV lamp strip is arranged on the first cooling base, the first lamp head and the second lamp head are respectively arranged at two ends of the first cooling base.

4. The plant growth lamp of claim 3, wherein the first lamp head comprises a base housing and a sliding housing, the electrical male plug is fixed to and exposed from the sliding housing, the sliding housing is slidably arranged on the base housing.

5. The plant growth lamp of claim 4, wherein the base housing comprises a first body shell, a groove cavity and two protruding walls, the groove cavity is defined on one side of the first body shell towards the first cooling base, the two protruding walls are spaced on the first body shell and extended towards the sliding housing; each protruding wall defines a card slot; the sliding housing comprises a second body shell, a sliding block and buckles, the sliding block is extended from the second body shell to a portion between the two protruding walls, and the sliding block is arranged between the two protruding walls, the buckles are slidably arranged in the card slots.

6. The plant growth light of claim 5, wherein the power module comprises a main control box, plugs arranged at two opposite ends of the main control box, and dip switches installed on the plugs, the dip switch is used to adjust output power of the main control box.

7. The plant growth light of claim 5, wherein a mounting slot is defined on the sliding block for installing the electrical male plug.

8. The plant growth lamp of claim 5, wherein a through hole communicated with the groove cavity is defined on the first body shell, and the UV lamp strip passes through the groove cavity and the through hole to connect to the electrical male plug by wires.

9. The plant growth lamp of claim 3, wherein the first cooling base is a plate reinforcement, a clamping slot is defined on the first cooling base to receive the UV lamp strip.

10. The plant growth lamp of claim 3, wherein the main light emitting component comprises a main light strip, a second cooling base, a third lamp head, and a fourth lamp head, the main light strip is arranged on the second cooling base, the third lamp head and the fourth lamp head are respectively arranged on two opposite side end of the second cooling base, the third lamp head is installed on the second side surface and the fourth lamp head is installed on the first side surface.

11. The plant growth lamp of claim 10, wherein the third lamp head is integrated with the second mounting frame.

12. The plant growth lamp of claim 3, wherein the first bracket and second bracket both comprise a plurality of long frames and a plurality of hinged assemblies arranged on ends of two adjacent long frames, each hinged assembly comprises two connecting heads hinged with each other, the two connecting heads are respectively correspond to and connected to the ends of the two adjacent long frames, the two adjacent long frames are folded and expanded through the hinged assembly.

13. The plant growth lamp of claim 12, wherein the number of the long frames is three, three long frames namely are a first strip, a second strip and a third strip which connected sequentially, the hinged assembly comprises a first hinged module and a second hinged module, the first hinged module is arranged between the first strip and the second strip, the second hinged module is arranged between the second strip and the third strip, and the first strip is rotated relative to the second strip to fold to and fit the second strip, the third strip is rotated relative to the second strip to fit the first strip.

14. The plant growth lamp of claim 12, wherein the first mounting frame, the supporter and the first locking member are all metal parts.

15. A UV lamp, comprising:

a first bracket;

a second bracket arranged at an interval with the first bracket;

a UV light emitting component installed on the first bracket and the second bracket; and a power module installed on the first bracket and the second bracket;

wherein a first side surface of the first bracket is opposite to a second side surface of the second bracket, a first mounting frame is arranged on the first side surface, and an electrical female socket is arranged on the second side surface; two ends of the UV light emitting component are respectively defined to be a first end and a second end, the first end is detachable and arranged on the first mounting frame through a first locking screw, and the second end comprises an electrical male plug sliding relative to the electrical female socket; the electrical male plug is inserted into the electrical female socket; and the power module is electrically connected to the electrical female socket; and wherein a second mounting frame is arranged on the second side surface, the second mounting frame is used to support the second end of the UV light emitting component and is detachable connected to the second mounting frame and the second end by the second locking screw; the first mounting frame comprises a fixed plate and an insert plate connected to the fixed plate, a slot is defined on the first end for inserting the insert plate, the fixed plate is fixed on the first side surface.

16. The UV lamp of claim 15, wherein the UV light emitting component comprises a first lamp head, a second lamp head, a first cooling base and a UV lamp strip, the UV lamp strip is arranged on the first cooling base, the first lamp head and the second lamp head are respectively arranged at two ends of the first cooling base.

17. The UV lamp of claim 15, wherein the first lamp head comprises a base housing and a sliding housing, the electrical male plug is fixed to and exposed from the sliding housing, the sliding housing is slidably arranged on the base housing; the base housing comprises a first body shell, a groove cavity and two protruding walls, the groove cavity is defined on one side of the first body shell towards the first cooling base, the two protruding walls are spaced on the first body shell and extended towards the sliding housing; each protruding wall defines a card slot; the sliding housing comprises a second body shell, a sliding block and buckles, the sliding block is extended from the second body shell to a portion between the two protruding walls, and the sliding block is arranged between the two protruding walls, the buckles are slidably arranged in the card slots.

* * * * *